United States Patent
Ryu et al.

(10) Patent No.: US 8,306,515 B2
(45) Date of Patent: Nov. 6, 2012

(54) MOBILE TERMINAL CAPABLE OF PROVIDING WEATHER INFORMATION AND METHOD OF CONTROLLING THE MOBILE TERMINAL

(75) Inventors: Hye Jin Ryu, Seoul (KR); Jin Woo Chung, Seoul (KR); Dong Seok Lee, Seoul (KR); Jeong Yun Heo, Seoul (KR); Moon Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/352,659

(22) Filed: Jan. 13, 2009

(65) Prior Publication Data

US 2009/0186604 A1  Jul. 23, 2009

(30) Foreign Application Priority Data

Jan. 14, 2008  (KR) ................ 10-2008-0004079

(51) Int. Cl.
*H04L 29/06* (2006.01)
(52) U.S. Cl. ............ 455/414.3; 455/414.1; 455/414.2; 455/466; 455/566
(58) Field of Classification Search .............. None
See application file for complete search history.

(56) References Cited

U.S. PATENT DOCUMENTS

| | | | | |
|---|---|---|---|---|
| 7,271,715 B2 * | 9/2007 | Aupperle et al. | ....... | 340/539.13 |
| 7,593,755 B2 * | 9/2009 | Colando et al. | ....... | 455/566 |
| 7,657,281 B2 * | 2/2010 | Eibye | ....... | 455/550.1 |
| 2002/0090976 A1 | 7/2002 | Chatain | | |
| 2005/0240378 A1 | 10/2005 | Smith et al. | | |
| 2006/0035628 A1 * | 2/2006 | Miller et al. | ....... | 455/414.3 |
| 2006/0229810 A1 | 10/2006 | Cross et al. | | |
| 2006/0267783 A1 * | 11/2006 | Smith | ....... | 340/601 |
| 2006/0286929 A1 * | 12/2006 | Schlafly et al. | ....... | 455/3.06 |
| 2007/0112511 A1 * | 5/2007 | Burfeind et al. | ....... | 701/213 |
| 2007/0159355 A1 * | 7/2007 | Kelly et al. | ....... | 340/905 |
| 2007/0250591 A1 | 10/2007 | Milic-Frayling et al. | | |
| 2007/0256716 A1 * | 11/2007 | Resner et al. | ....... | 135/16 |
| 2008/0104018 A1 * | 5/2008 | Xia | ....... | 707/3 |

FOREIGN PATENT DOCUMENTS

| | | |
|---|---|---|
| FR | 2 815 501 A1 | 4/2002 |
| JP | 2004-294236 A | 10/2004 |
| JP | 2007-110394 A | 4/2007 |

* cited by examiner

*Primary Examiner* — Rafael Pérez-Gutiérrez
*Assistant Examiner* — Suhail Khan
(74) *Attorney, Agent, or Firm* — Birch, Stewart, Kolasch & Birch, LLP (57) ABSTRACT

A method of controlling a mobile terminal is provided. The method includes displaying a first screen image, receiving weather information, providing a semi-transparent filter effect corresponding to the weather information, and overlaying the semi-transparent filter effect onto the first screen image to create a second composite image, and displaying the second composite image. A mobile terminal is also provided, which includes a display module configured to display a first screen image as an idle screen background, a wireless communication unit configured to receive weather information through a communication network, and a controller configured to overlay a semi-transparent filter effect corresponding to the received weather information onto the first screen image to create a second composite image, and then to display the second composite image.

16 Claims, 12 Drawing Sheets

MOBILE TERMINAL CAPABLE OF PROVIDING WEATHER INFORMATION AND METHOD OF CONTROLLING THE MOBILE TERMINAL

CROSS-REFERENCE TO RELATED APPLICATIONS

This application claims priority to Korean Patent Application No. 10-2008-0004079, filed on Jan. 14, 2008, the disclosure of which is incorporated herein by reference in its entirety.

BACKGROUND OF THE INVENTION

1. Field of the Invention

The present invention generally relates to a mobile terminal and a method of controlling the mobile terminal. More particularly, the present invention relates to a mobile terminal that is configured to receive weather information and overlay a semi-transparent effect corresponding to the received weather information to create a composite image displayed by the mobile terminal, and a method of controlling the mobile terminal to display the received weather information.

2. Description of Related Art

Mobile terminals are portable devices that are capable of providing various services such as, for example, a voice calling service, a video calling service, an information input/output service, and a data storage service. Over time, the types of services provided by mobile terminals have diversified, resulting in an increasing number of mobile terminals that are equipped to provide various complicated functions such as, for example, capturing photos or moving pictures, playing music files or moving image files, providing game programs, receiving broadcast programs, and providing wireless Internet services. These multi-functional mobile terminals have thus evolved into multimedia players.

Various attempts have been made to realize such complicated functions using hardware devices or software programs. For example, various user interface (UI) environments, in which users are allowed to easily search for and choose desired functions, have been developed. In addition, the demand for various designs for mobile terminals such as, for example, a double-sided liquid crystal display (LCD) or a full touch screen, has steadily grown due to an increasing perception that mobile terminals are personal items that represent a user's personality.

Conventionally, users are required to manipulate their mobile terminals in order to be provided with various additional information. For example, in order to obtain weather information, users need to access a wireless Internet service with their mobile terminals and then to download weather information from the wireless Internet service.

BRIEF SUMMARY OF THE INVENTION

The present invention provides a mobile terminal, which displays or outputs weather information provided thereto in real time with the use of a screen background and can thus allow a user to intuitively recognize the weather information, and a method of controlling the mobile terminal.

The present invention also provides a mobile terminal, which outputs alarm information corresponding to weather information provided thereto in real time and can thus allow a user to appropriately respond to the weather, and a method of controlling the mobile terminal.

According to principles of this invention, a method of controlling a mobile terminal is provided. The method includes displaying a first screen image, receiving weather information, providing a semi-transparent filter effect corresponding to the weather information, and overlaying the semi-transparent filter effect onto the first screen image to create a second composite image, and displaying the second composite image.

In addition, according to principles of the present invention, a mobile terminal is provided. The mobile terminal includes a display module configured to display a first screen image as an idle screen background, a wireless communication unit configured to receive weather information through a communication network, and a controller configured to overlay a semi-transparent filter effect corresponding to the received weather information onto the first screen image to create a second composite image, and then to display the second composite image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may include a mobile phone, a smart phone, a laptop book computer, a digital broadcast receiver, a personal digital assistant (PDA), a portable multimedia player (PMP), or a navigation device. It is also to be noted that the suffix of constituent elements used in the following description, such as 'module' and 'unit', are simply assigned for ease of describing the invention, but are not specifically assigned according to importance and roles. Accordingly, the terms "module" and "unit" can be interchangeable.

Figure 1:
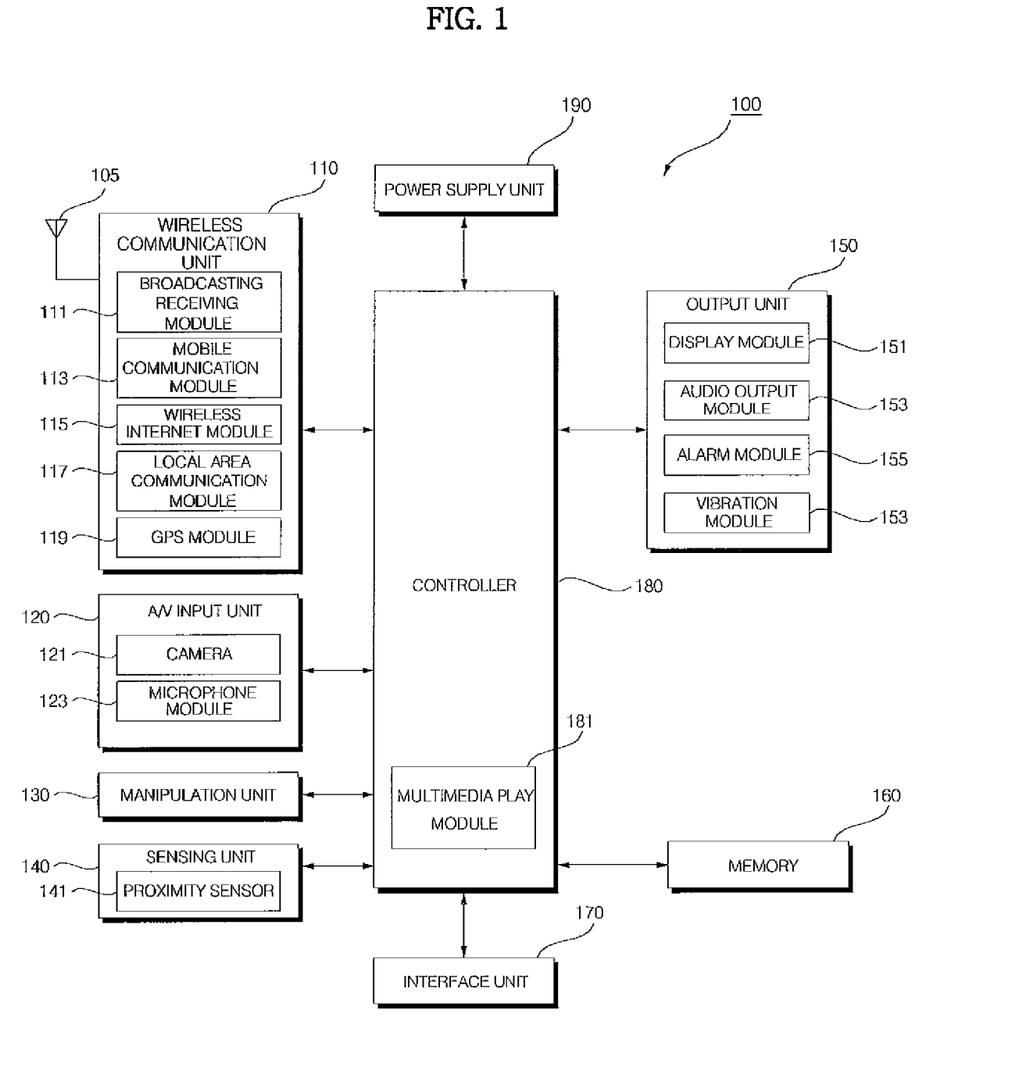
FIG. 1 is a block diagram of a mobile terminal according to an exemplary embodiment of the present invention.

FIG. 1 shows a block diagram of a mobile terminal 100 according to an exemplary embodiment of the present invention. Referring to FIG. 1, the mobile terminal 100 may include a wireless communication unit 110, an audio/video (A/V) input unit 120, a manipulation unit 130, a sensing unit 140, an output unit 150, a memory 160, an interface unit 170, a controller 180, and a power supply unit 190. Two or more of the wireless communication unit 110, the A/V input unit 120, the manipulation unit 130, the sensing unit 140, the output unit 150, the memory 160, the interface unit 170, the controller 180, and the power supply unit 190 may be incorporated into a single unit, or some of the wireless communication unit 110, the A/V input unit 120, the manipulation unit 130, the sensing unit 140, the output unit 150, the memory 160, the interface unit 170, the controller 180, and the power supply unit 190 may be divided into two or more smaller units.

The wireless communication unit 110 may include a broadcast receiving module 111, a mobile communication module 113, a wireless Internet module 115, a short-range communication module 117, and a global positioning system (GPS) module 119.

The broadcast receiving module 111 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information. Alternatively, the broadcast management server may be a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast receiving module 111. The broadcast-related information may come in various forms, for example, electronic program guide (EPG) for Digital Multimedia Broadcasting (DMB) or electronic service guide (ESG) for Digital Video Broadcast-Handheld (DVB-H).

The broadcast receiving module 111 may receive the broadcast signal using various broadcasting systems such as, for example, Digital Multimedia Broadcasting-Terrestrial (DMB-T), Digital Multimedia Broadcasting-Satellite (DMB-S), media forward link only (MediaFLO), DVB-H, and Integrated Services Digital Broadcast-Terrestrial (ISDB-T). In addition, the broadcast receiving module 111 may be configured to be suitable for nearly all types of broadcasting systems other than those set forth herein. The broadcast signal and/or the broadcast-related information received by the broadcast receiving module 111 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as BLUETOOTH, radio frequency identification (RFID), infrared data association (IrDA), ultra wideband (UWB), and ZIGBEE.

The GPS module 119 may receive position information from a plurality of GPS satellites.

The A/V input unit 120 may be used to receive audio signals or video signals. The A/V input unit 120 may include a camera 121 and a microphone module 123. The camera 121 may be configured to process various image frames such as still images or moving images captured by an image sensor during a video call mode or an image capturing mode. The image frames processed by the camera 121 may be displayed by a display module 151 of the output unit 150. The image frames processed by the camera 121 may be stored in the memory 160 or may be transmitted outside the mobile terminal 100 through the wireless communication unit 110. The mobile terminal 100 may include two or more cameras 121.

The microphone module 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone module 123 may use various noise removal algorithms to remove extraneous noise that may be generated during the reception of external sound signals.

The manipulation unit 130 generates key input data based on user input for controlling the operation of the mobile terminal 100. The manipulation unit 130 may be implemented as a keypad, a dome switch, a touch pad (either static pressure or constant electricity), a jog wheel, or a jog dial. In particular, if the manipulation unit 130 is implemented as a touch pad and forms a mutual layer structure along with the display module 151, the manipulation unit 130 and the display module 151 may be collectively referred to as a touch screen.

The sensing unit 140 determines a current state of the mobile terminal 100 such as, for example, whether the mobile terminal 100 is opened or closed, the position of the mobile terminal 100, or whether the mobile terminal 100 is placed in contact with a user by a proximity sensor 141, and generates a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153, and an alarm module 155. The display module 151 may display various information processed by the mobile terminal 100.

For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

As described above, if the display module 151 and the manipulation unit 130 form a mutual layer structure and are thus implemented as a touch screen, the display module 151 may be used not only as an output device but also as an input device. The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call placing mode, a recording mode, a voice recognition mode, or a broadcast reception mode. The audio output module 153 may also output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of events include receiving a call signal, receiving a message, and receiving a key signal. Examples of the alarm signal output by the alarm module 155 include an audio signal, a video signal, and a vibration signal. The alarm module 155 may output vibration upon receiving a call signal or a message. In addition, the alarm module 155 may receive a key signal and may output vibration as feedback to the key signal. Once vibration is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100.

The exterior of the mobile terminal 100 according to the exemplary embodiment of the present invention will hereinafter be described in detail with reference to FIGS. 2 and 3. In this exemplary embodiment, the mobile terminal 100 is a slider-type mobile phone; however, the present invention is not restricted to a slider-type mobile phone. Rather, the present invention can be applied to various mobile terminals, such as, for example, bar-type, folding-type, or other types of mobile terminals.

Figure 2:
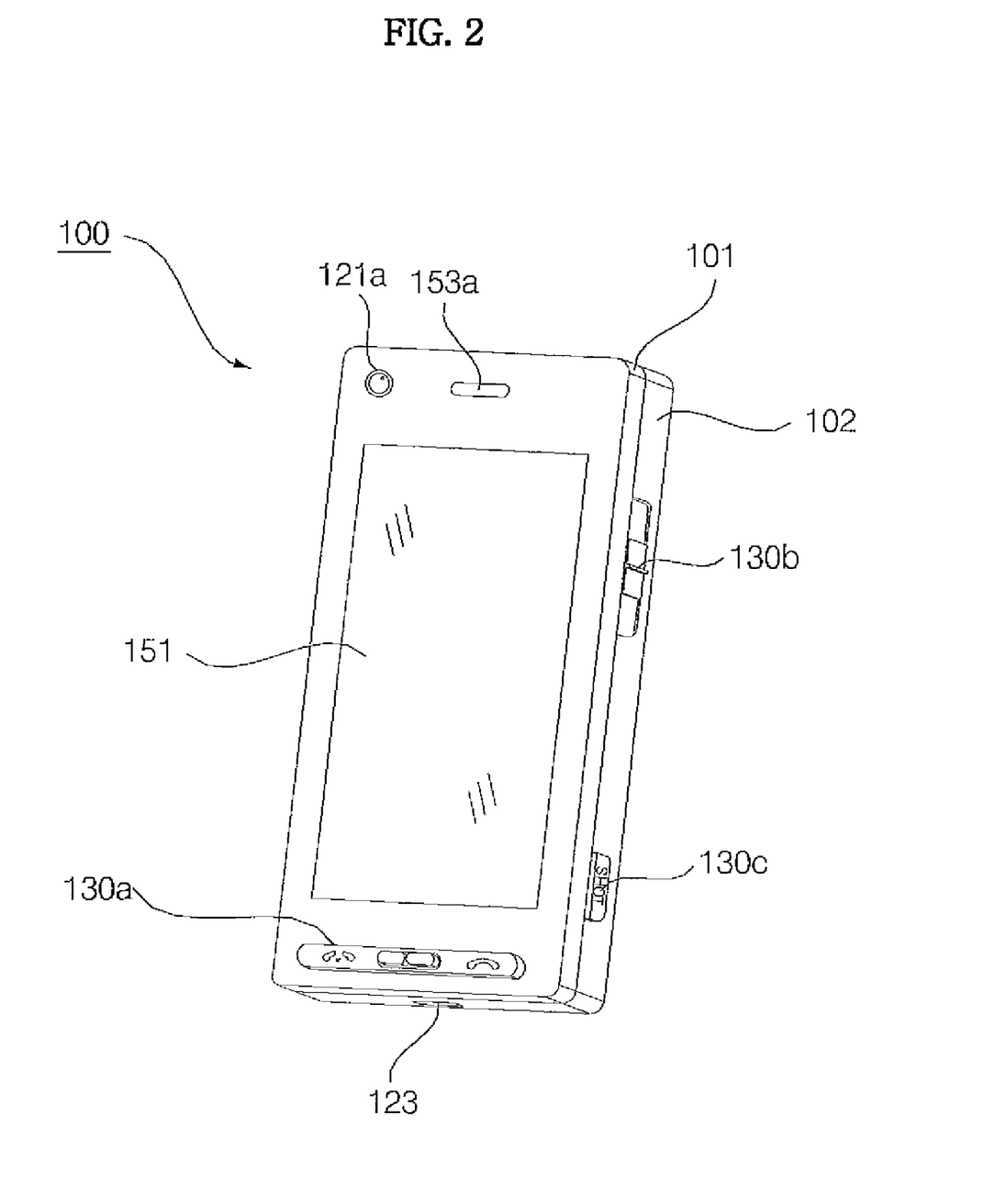
FIG. 2 is a front perspective view of the mobile terminal according to an exemplary embodiment of the present invention.

FIG. 2 shows a front perspective view of the mobile terminal 100 according to an exemplary embodiment of the present invention. Referring to FIG. 2, the mobile terminal 100 may include a front case 101 and a rear case 102, which form the exterior of the first body 100A. Various electronic components may be installed in the space between the front case 101 and the rear case 102. At least one intermediate case may be additionally disposed between the front case 101 and the rear case 102. The front case 101 and the rear case 102 may be formed of a synthetic resin through injection molding. Alternatively, the front case 101 and the rear case 102 may be formed of a metal such as stainless steel (STS) or titanium (Ti).

The display module 151, a first sound module 153a, a first camera 121a, and a first manipulation unit 130a may be disposed in the main body of the mobile terminal 100, and particularly, in the front case 101. A second manipulation unit 130b, a third manipulation unit 130, and the microphone module 123 may be disposed on a lateral side of the rear case 102.

As described above, the display module 151 may include an LCD or an OLED, which visually represents information. A touch pad may be configured to overlay the display module 151 to provide a layered structure, and, as a result, the display module 151 may serve as a touch screen. Thus, it is possible for a user to input information to the display module 151 simply by touching the display module 151.

The first sound module 153a may be implemented as a receiver or a speaker. The first camera 121a may be configured to capture a still image or a moving image of a user. The microphone module 123 may be designed so as to be able to effectively receive the voice of a user or other sounds.

The first through third manipulation units 130a through 130e may be collectively referred to as the manipulation unit 130. The manipulation unit 130 may adopt various manipulation methods as long as it can offer tactile feedback to a user. For example, the manipulation unit 130 may be implemented as a dome switch or a touch pad which receives a command or information upon being pushed or touched by a user. Alternatively, the manipulation unit 130 may be implemented as a jog wheel, a jog dial, or a joystick. The first manipulation unit 130a may allow a user to input such commands as 'start', 'end', and 'scroll'. The second manipulation unit 130b may allow a user to choose an operating mode. The third manipulation unit 130c may serve as a hot key for activating certain functions of the mobile terminal 100.

Figure 3:
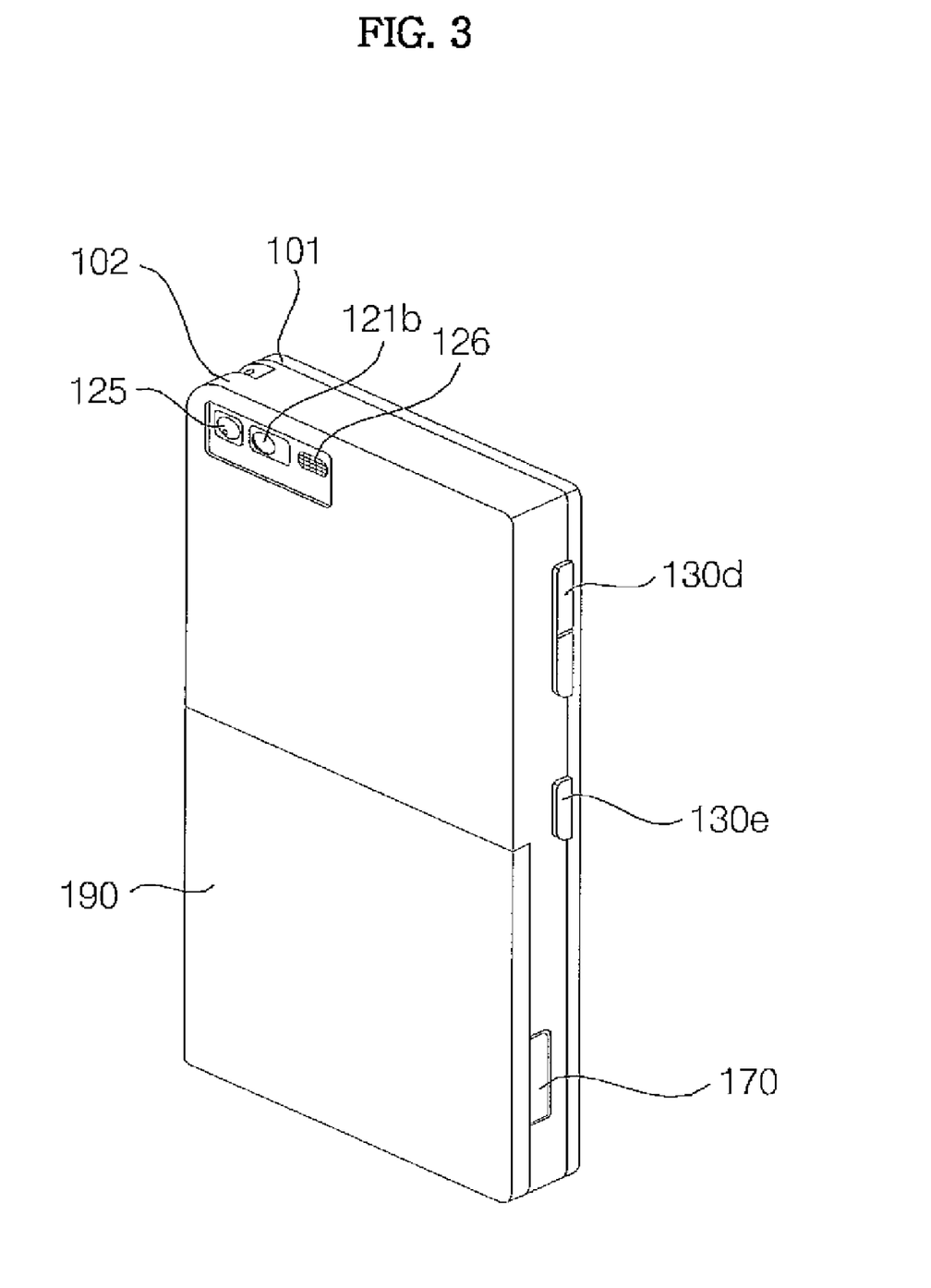
FIG. 3 is a rear perspective view of the mobile terminal shown in FIG. 2.

FIG. 3 shows a rear perspective view of the mobile terminal 100 shown in FIG. 2. Referring to FIG. 3, a fourth manipulation unit 130d, a fifth manipulation unit 130e, and the interface unit 170 may be disposed on a lateral side of the rear case 102, and a second camera 121b may be disposed at the rear of the rear case 102.

The second camera 121b may have a different photographing direction from that of the first camera 121a (shown in FIG. 2). In addition, the number of pixels of the second camera 121b may be different from the number of pixels of the first camera 121a. For example, the first camera 121a may be used to capture an image of the face of a user and then transmit the captured image during a video call. Thus, a low-pixel camera may be used as the first camera 121a. The second camera 121b may be used to capture an image of an ordinary subject. Given that images captured by the second camera 121b generally do not need to be transmitted, a high-pixel camera may be used as the second camera 121b. A mirror 125 and a camera flash 126 may be disposed near the second camera 121b. The camera flash 126 illuminates a subject when the second camera 121b captures an image of the subject and the user may look in the mirror 125 for taking a self shot.

While the second camera 121b is shown as being disposed in the rear case 102, the present invention is not restricted to this configuration. For example, the first camera 121a may be mounted to rotate to cover the photographing direction of the second camera 121b. In this case, the second camera 121b may be eliminated.

A second audio output module (not shown) may be additionally provided in the rear case 102. The second audio output module may realize a stereo function along with the first audio output module 153a. The second audio output module may also be used during a speaker-phone mode.

An antenna (not shown) for receiving a broadcast signal may be disposed on one side of the rear case 102. The antenna may be installed so as to be able to be pulled out from the second body 100B-2.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may be a subscriber identification module (SIM) or a user identification module (UIM) or may be a card socket for an exterior-type card such as a memory card for storing data.

The power supply unit 190 may be inserted in the rear case 102. The power supply unit 190 may be a rechargeable battery and may be coupled to the rear case 102 so as to be able to be attached to or detached from the rear case 102.

Figure 4:
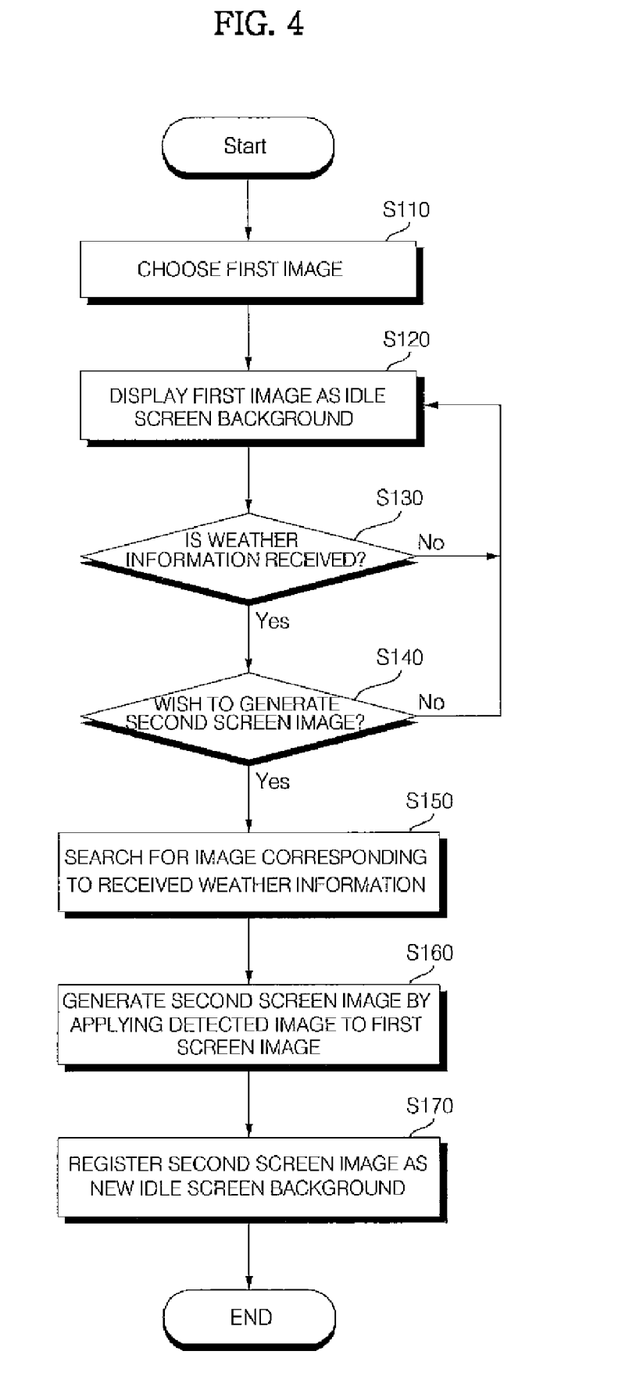
FIG. 4 is a flowchart of a method of controlling a mobile terminal according to an exemplary embodiment of the present invention.

FIG. 4 is a flowchart of a method of controlling a mobile terminal according to an exemplary embodiment of the present invention. Referring to FIG. 4, a first screen image may be chosen as an idle screen background (S110). The first screen image may be replaced with another screen image at any time. The first screen image may be chosen through user setting or default setting. The idle screen background is a screen image displayed on the screen of the mobile terminal 100 when the mobile terminal 100 is placed in an idle mode. The exemplary embodiment of FIG. 4 is characterized by displaying weather information on a screen background. The exemplary embodiment of FIG. 4 will hereinafter be described in detail, taking an idle screen background as an example.

Referring to FIG. 4, the controller 180 may display the first screen image on the screen of the display module 151 as the idle screen background (S120). The controller 180 may place the mobile terminal 100 in the idle mode as soon as the first screen image is displayed on the screen of the display module 151 as the idle screen background.

The mobile terminal 100 may be provided with weather information in real time even when in the idle mode. More specifically, the mobile terminal 100 may be periodically provided with weather information by using a wireless Internet function. A base station may periodically transmit weather information to the mobile terminal 100 through text messages. The mobile terminal 100 may determine whether weather information has been received (S130).

If it is determined that weather information has been received, the controller 180 may determine whether the user wishes to display the received weather information on the idle screen background (S140). The user may sometimes wish to manually search for weather information without a requirement of displaying the received weather information on the idle screen background. Therefore, the controller 180 may determine whether the user wishes to generate a second screen image into which the received weather information is contained (S140).

If the user wishes to generate a second screen image into which the received weather information is contained, the controller 180 may search for an image corresponding to the received weather information (S150). For this, various images may be stored in advance in the mobile terminal 100. Alternatively, the mobile terminal 100 may download various images from an external source through a wireless Internet connection.

The controller 180 may generate a second screen image by applying the detected image to the first screen image (S160). More specifically, the controller 180 may generate a second screen image by applying a filtering effect to the first screen image to form a composite image of the first screen image and the filtering effect. In other words, the first screen image and filtering effect are combined to form a second composite image. For example, the controller 180 may apply a halation effect filter to the first screen image in order to represent a clear day, the controller 180 may apply a raindrop effect filter to the first screen image in order to represent a rainy day, or the controller 180 may apply a snow effect filter to the first screen image in order to represent a snowy day. In this manner, the controller 180 may obtain the benefits of overlaying a semi-transparent image corresponding to the received weather information over the first screen image to form a composite image. By providing a semi-transparent image, the first image screen and information remains visible through the filter effect.

Alternatively, the controller 180 may generate a second screen image by overlaying another image corresponding to the received weather information over the first screen image without a requirement of additional filtering. The generation of a second screen image may be performed in various manners, other than those set forth herein.

The controller 180 may register the second screen image generated in operation S160 as a new idle screen background (S170). Therefore, it is possible for the user to intuitively recognize the received weather from the new idle screen background.

The mobile terminal 100 may be equipped with a function that enables the user to add an image or icon corresponding to the received weather information to a text message and then to transmit the text message. Therefore, not only the user but also whoever receives the text message may intuitively recognize the received weather information.

If the user previously sets an alarm function in the mobile terminal 100, alarm settings may be automatically modified according to the received weather information. For example, if the received weather information indicates that the temperature is below a predefined level or the weather is cloudy, alarm settings may be automatically modified so that an alarm can go off a predetermined amount of time later than the original alarm time. Likewise, if the received weather information indicates that the weather is rainy or snowy, alarm settings may be automatically modified so that an alarm can go off a predetermined amount of time earlier than the original alarm time. In this manner, it is possible for the user to appropriately respond to weather changes with reference to the received weather information.

Figure 5:
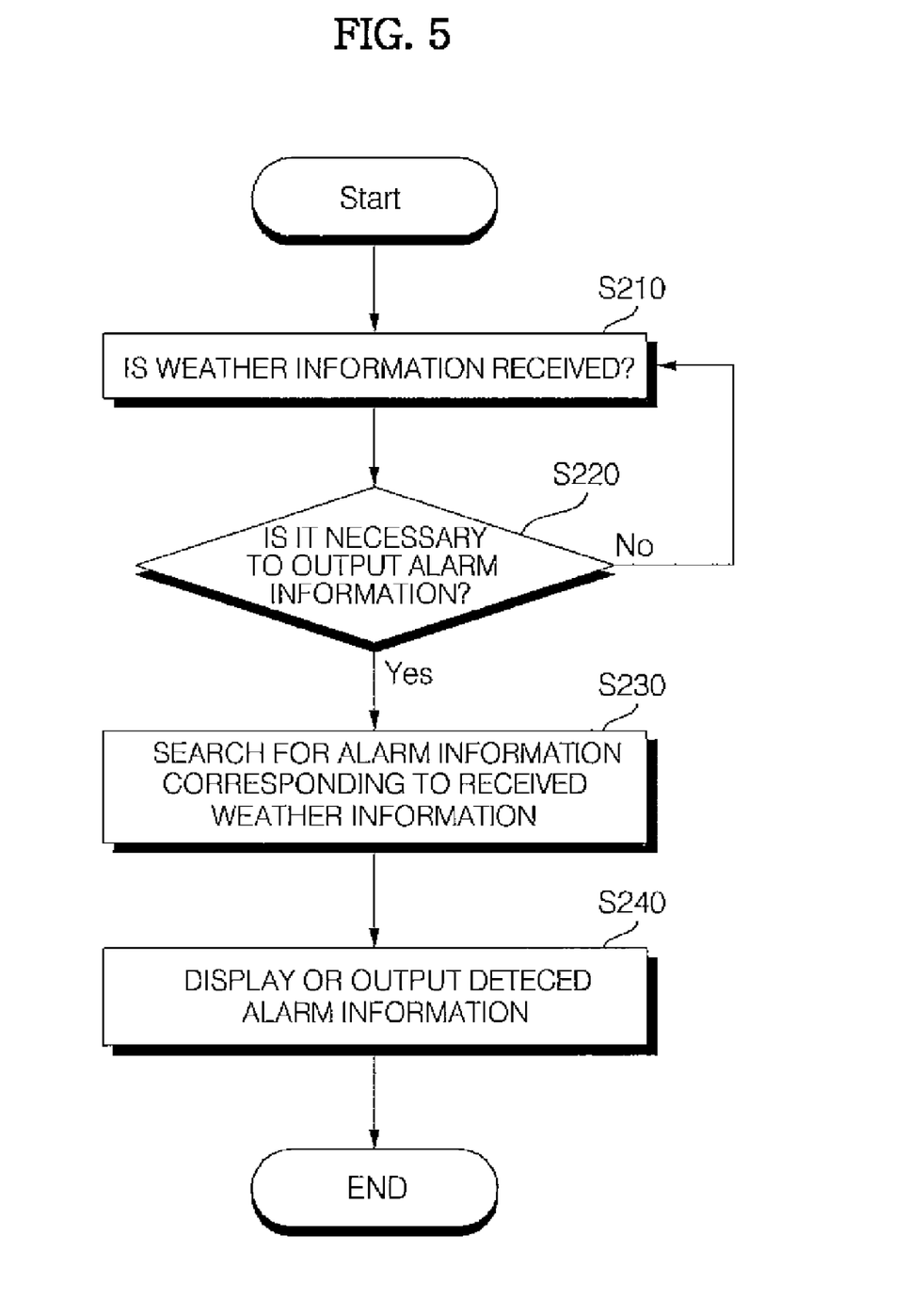
FIG. 5 is a flowchart of a method of controlling a mobile terminal according to another exemplary embodiment of the present invention.
Figure 6:
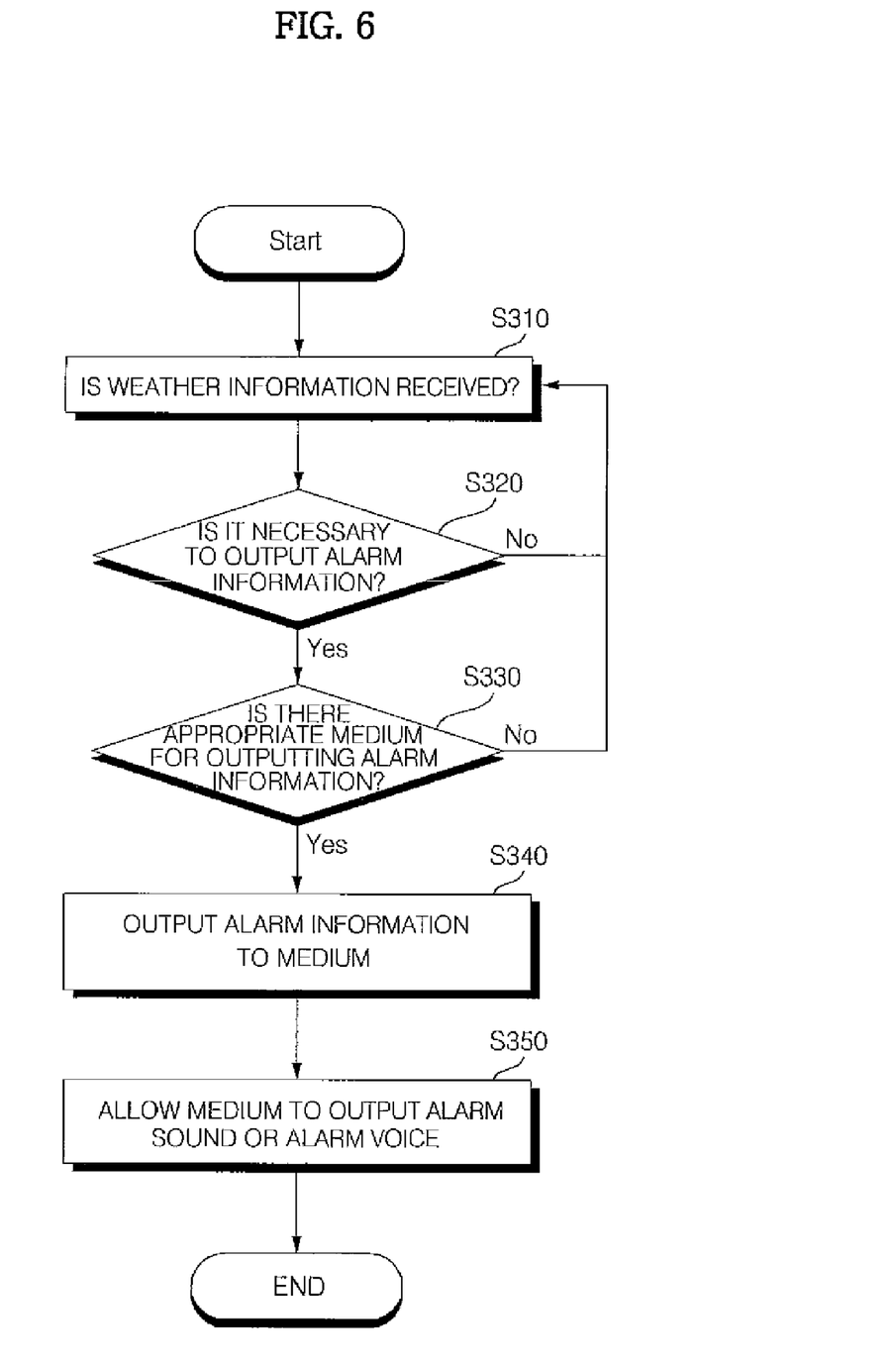
FIG. 6 illustrates a flowchart of a method of controlling a mobile terminal according to another exemplary embodiment of the present invention.

FIGS. 5 and 6 are flowcharts of methods of controlling a mobile terminal according to other exemplary embodiments of the present invention. In the exemplary embodiments of FIGS. 5 and 6, the mobile terminal 100 not only displays weather information received from an external source but also outputs alarm information corresponding to the received weather information. More specifically, the mobile terminal 100 may output all alarm sound or an alarm voice message as the alarm information. Alternatively, the mobile terminal 100 may display a blinking icon on the screen of the display module 151 as the alarm information. Different blinking icons may be displayed for different weather phenomena so that a user can easily recognize the weather and can appropriately prepare for the weather before going out.

FIG. 5 illustrates an exemplary embodiment where the mobile terminal 100 outputs alarm information. Referring to FIG. 5, if weather information is received (S210), the controller 180 may determine whether the received weather information requires alarm information to be output by the mobile terminal 100 (S220). More specifically, the controller 180 may decide whether to output alarm information based on the received weather information. For example, if the received weather information indicates that the weather is rainy or snowy and thus requires the user to bring an umbrella or a raincoat, the controller 180 may decide to output alarm information to allow the user to appropriately prepare for the weather. Likewise, if the received weather information indicates that a yellow dust warning has been issued or the ultraviolet (UV) index is high, the controller 180 may decide to output alarm information to allow the user to appropriately prepare for the weather. Various pieces of alarm information for different weather phenomena may be stored in advance in the mobile terminal 100.

Alternatively, the mobile terminal 100 may be provided with various pieces of alarm information for different weather phenomena as flags by an external source. In this case, the mobile terminal 100 may display various icons or various alarm sounds or voices based on the flags.

Referring to FIG. 5, if the received weather information requires alarm information to be output, the controller 180 may search for alarm information corresponding to the received weather information (S230). Thereafter, the controller 180 may control the alarm module 155 or the audio output module 153 to output the alarm information corresponding to the received weather information (S240).

FIG. 6 illustrates an exemplary embodiment where the mobile terminal 100 transmits alarm information to a separate medium and the medium outputs the alarm information. Referring to FIG. 6, if weather information is received (S310), the controller 180 may determine whether the received weather information requires alarm information to be output to the medium (S320).

If the received weather information requires alarm information to be output, the controller 180 may determine whether there is an appropriate medium for outputting alarm information corresponding to the received weather information (S330). The term 'medium', as used herein, indicates a wireless communication device attached to a weather-related product such as an umbrella, a raincoat, a mask, a hat, or a sun block. If the controller 180 transmits alarm information to a medium, the medium may output an alarm sound or an alarm voice message based on the alarm information.

Information indicating to what medium alarm information should be output for a given weather condition may be stored in the mobile terminal 100. For example, if the weather is rainy or snowy, alarm information may be output to an umbrella or a raincoat. Therefore, the mobile terminal 100 may analyze the received weather information and may determine whether there is an appropriate medium for outputting the alarm information corresponding to the received weather information.

If there is an appropriate medium for outputting the alarm information corresponding to the received weather information, the controller 180 may output the alarm information corresponding to the received weather information to the medium (S340). Then, the medium may output an alarm sound or an alarm voice message (S350). Therefore, it is possible for the user to appropriately respond to the received weather information with the aid of a device, other than the mobile terminal 100.

The mobile terminal 100 may transmit the alarm information corresponding to the received weather information to a medium as a wireless signal. For example, the mobile terminal 100 may be equipped with an interface for transmitting/receiving data from a medium with the aid of radio frequency identification (RFID) or BLUETOOTH. In this case, the mobile terminal 100 may transmit the alarm information corresponding to the received weather information to a medium through RFID or BLUETOOTH communication.

A medium that receives the alarm information corresponding to the received weather information may output an alarm sound or an alarm voice message. Alternatively, if the medium that receives the alarm information corresponding to the received weather information is capable of displaying information, the corresponding medium may display an alarm screen based on the alarm information corresponding to the received weather information, and may thus allow the user to appropriately prepare for the weather.

Figure 7A:
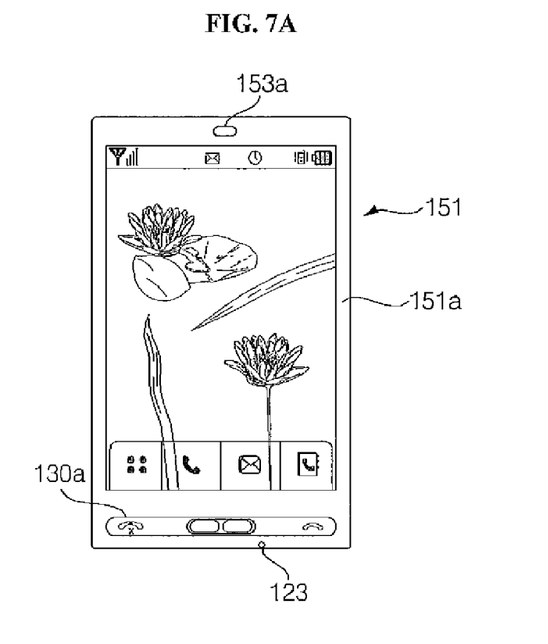
FIGS. 7 through 10 are diagrams for explaining the methods shown in FIGS. 4 through 6.

FIGS. 7A-7E are diagrams of various idle screen backgrounds into which weather information is reflected. More specifically, FIG. 7A illustrates a first screen image chosen as an idle screen background through user setting or default setting. Referring to FIG. 7A, the first screen image may be displayed on a screen 151a of the display module 151 until weather information is received. A user may release the mobile terminal 100 from an idle mode by inputting a command to the mobile terminal 100 through the user input unit 130a.

Once weather information is received, the controller 180 may analyze the received weather information, and may search for an appropriate image to be applied to the first screen image. More specifically, the controller 180 may apply different filtering effects to the first screen image for different weather phenomena. For example, if the received weather information indicates that the weather is clear, the controller 180 may apply a halation effect to the first screen image. On the other hand, if the received weather information indicates that the weather is unclear, the controller 180 may apply a rain or snow effect to the first screen image. In this manner, it is possible for the user to intuitively recognize the weather.

Figure 7B:
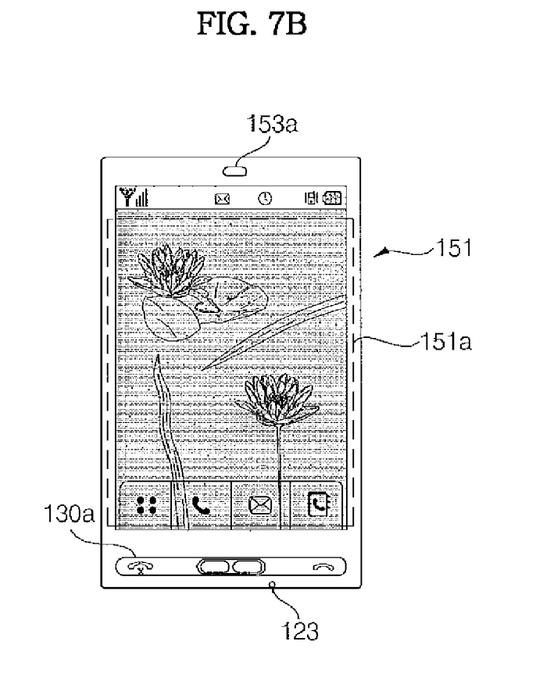

If the received weather information indicates that the weather is clear, a second screen image may be generated by applying a halation effect to the first screen image shown in FIG. 7B. Thereafter, the second screen image may be displayed as a new idle screen background, as shown in FIG. 7B.

Figure 7C:
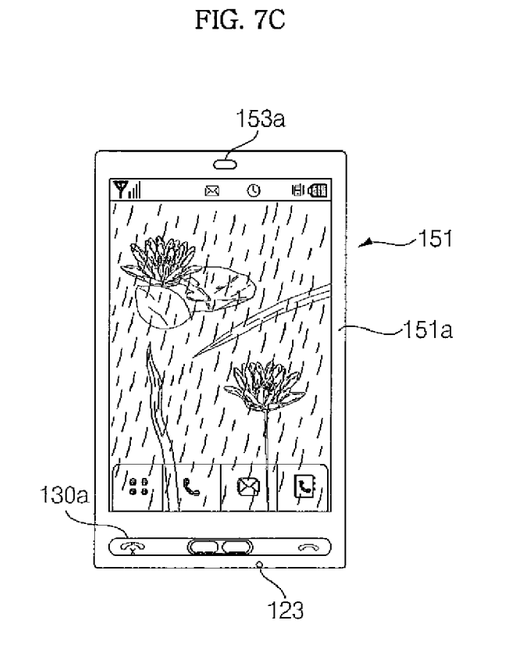
Figure 7D:
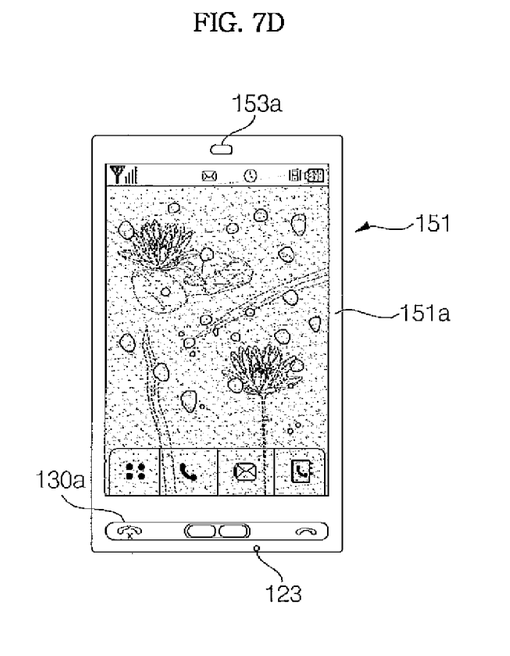
Figure 7E:
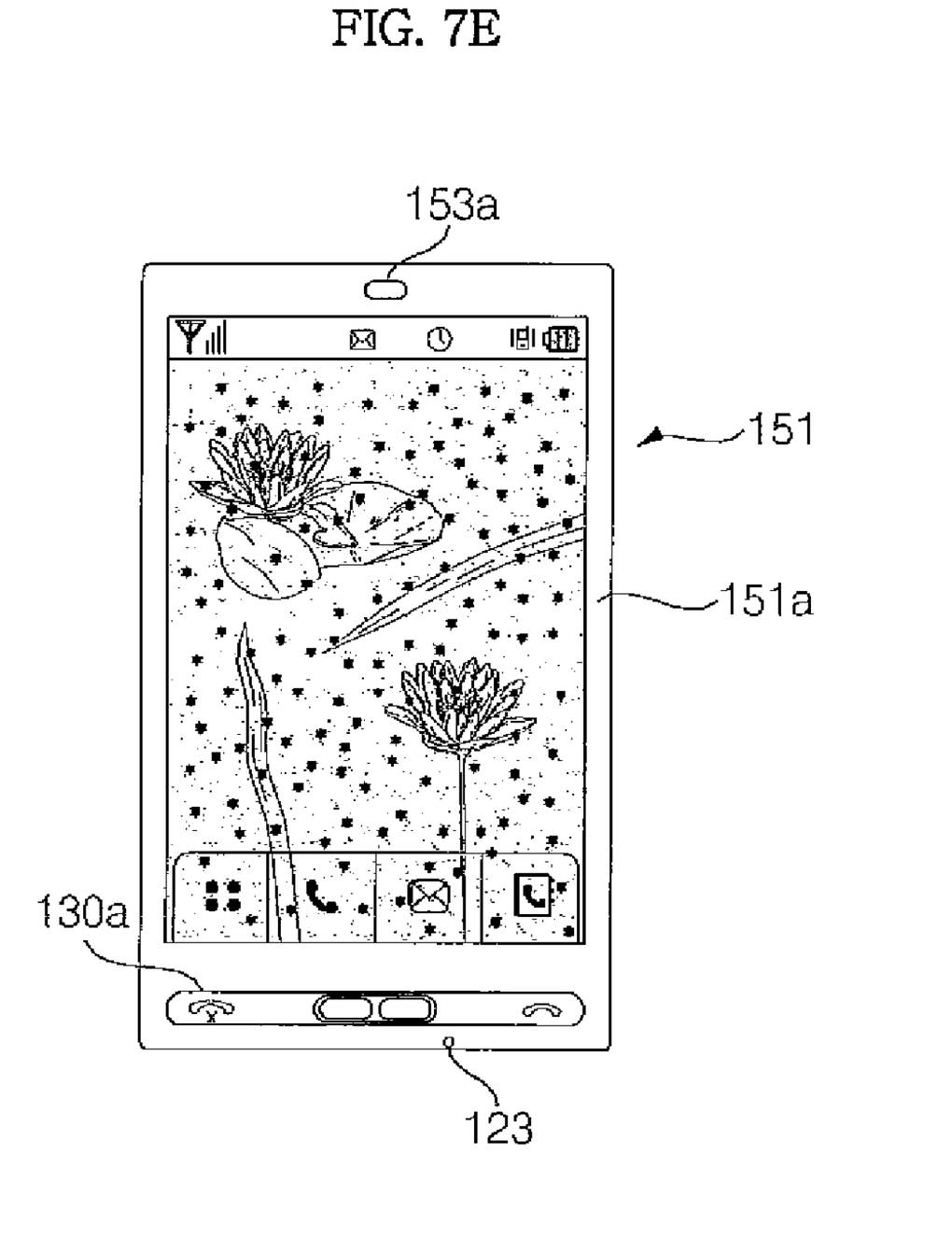

If the received weather information indicates that the weather is rainy, a second screen image may be generated by applying an image of rain falling or an image of raindrops on a glass window to the first screen image shown in FIG. 7A. Thereafter, the second screen image may be displayed as a new idle screen background, as shown in FIG. 7C or 7D. If the received weather information indicates that the weather is snowy, a second screen image may be generated by applying an image of snow falling to the first screen image shown in FIG. 7A. Thereafter, the second screen image may be displayed as a new idle screen background, as shown in FIG. 7E.

Figure 8A:
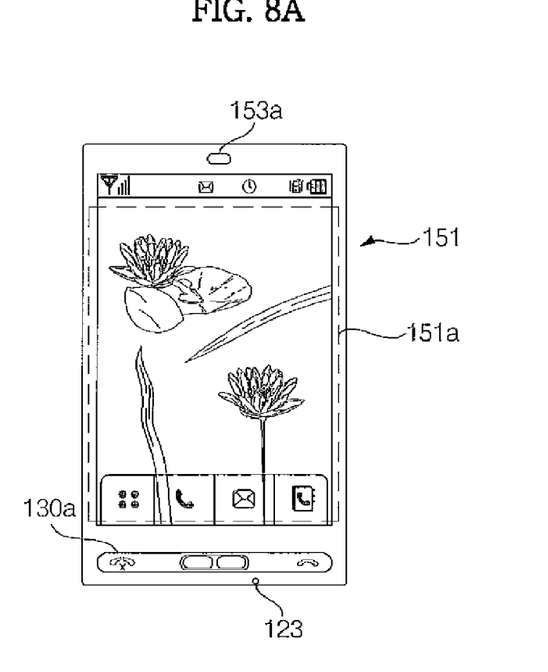
Figure 8B:
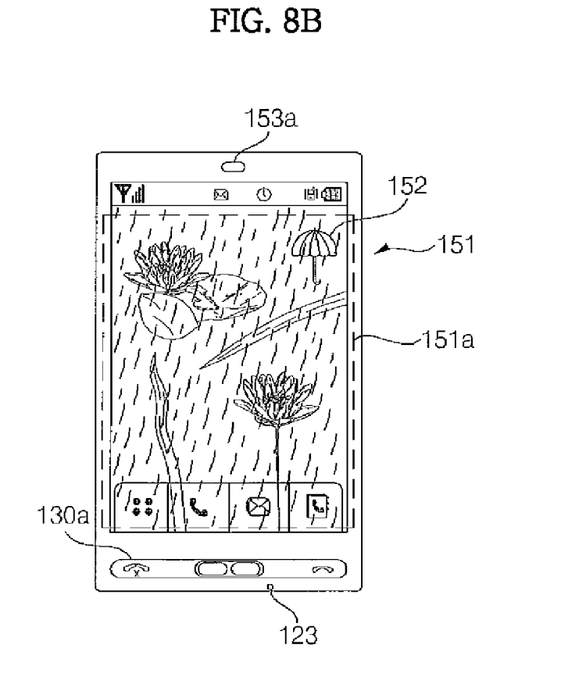

FIGS. 8A and 8B are diagrams explaining how to generate a second screen image and an icon corresponding to weather information. A first screen image may be displayed on the screen 151a of the display module 151 as an idle screen background, as shown in FIG. SA, until weather information is received. The mobile terminal 100 may receive weather information in real time. If the received weather information indicates that the weather is rainy, a rain effect may be applied to the first screen image shown in FIG. 8A, thereby generating a second screen image. Thereafter, the second screen image may be displayed on the screen 151a of the display module 151 as a new idle screen background, as shown in FIG. 8B. Referring to FIG. 8B, an icon 152 corresponding to the received weather information may also be displayed on the new idle screen background. The icon 152 may blink and may thus allow the user to easily recognize the received weather information. The icon 152 may be made to disappear from the screen 151a of the display module 151 or may be stopped from blinking by manipulating the first user manipulation unit 130a.

Figure 9A:
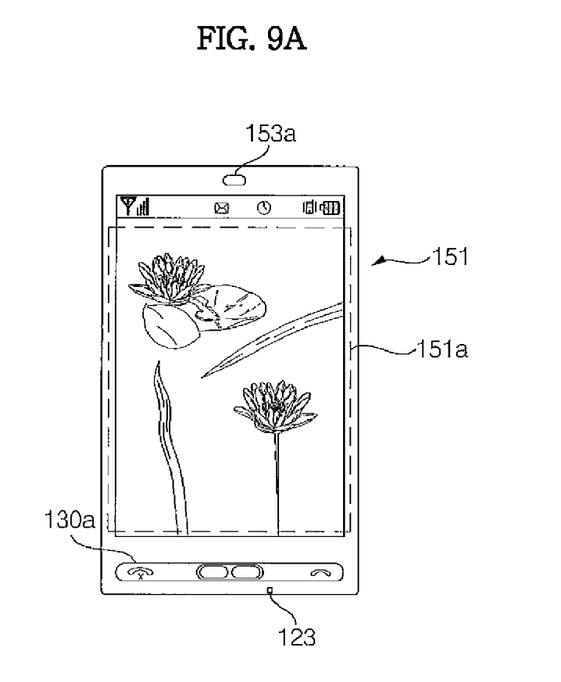
Figure 9B:
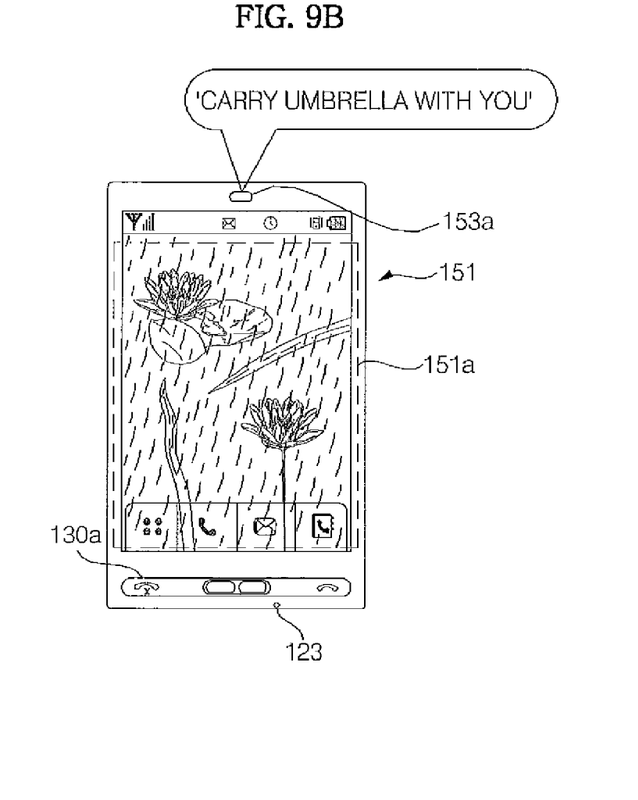

FIGS. 9A and 9B are diagrams explaining how to generate a second screen image and how to output an alarm sound or alarm voice message. If it rains when a first screen image is displayed on the screen 151a of the display module 151 as an idle screen background, as shown in FIG. 9A, a second screen image shown in FIG. 9B may be displayed on the screen 151a of the display module 151 as a new idle screen background. Then, the mobile terminal 100 may output an alarm voice message through the audio output module 153a to allow a user to appropriately respond to the weather based on the alarm voice message.

Figure 10:
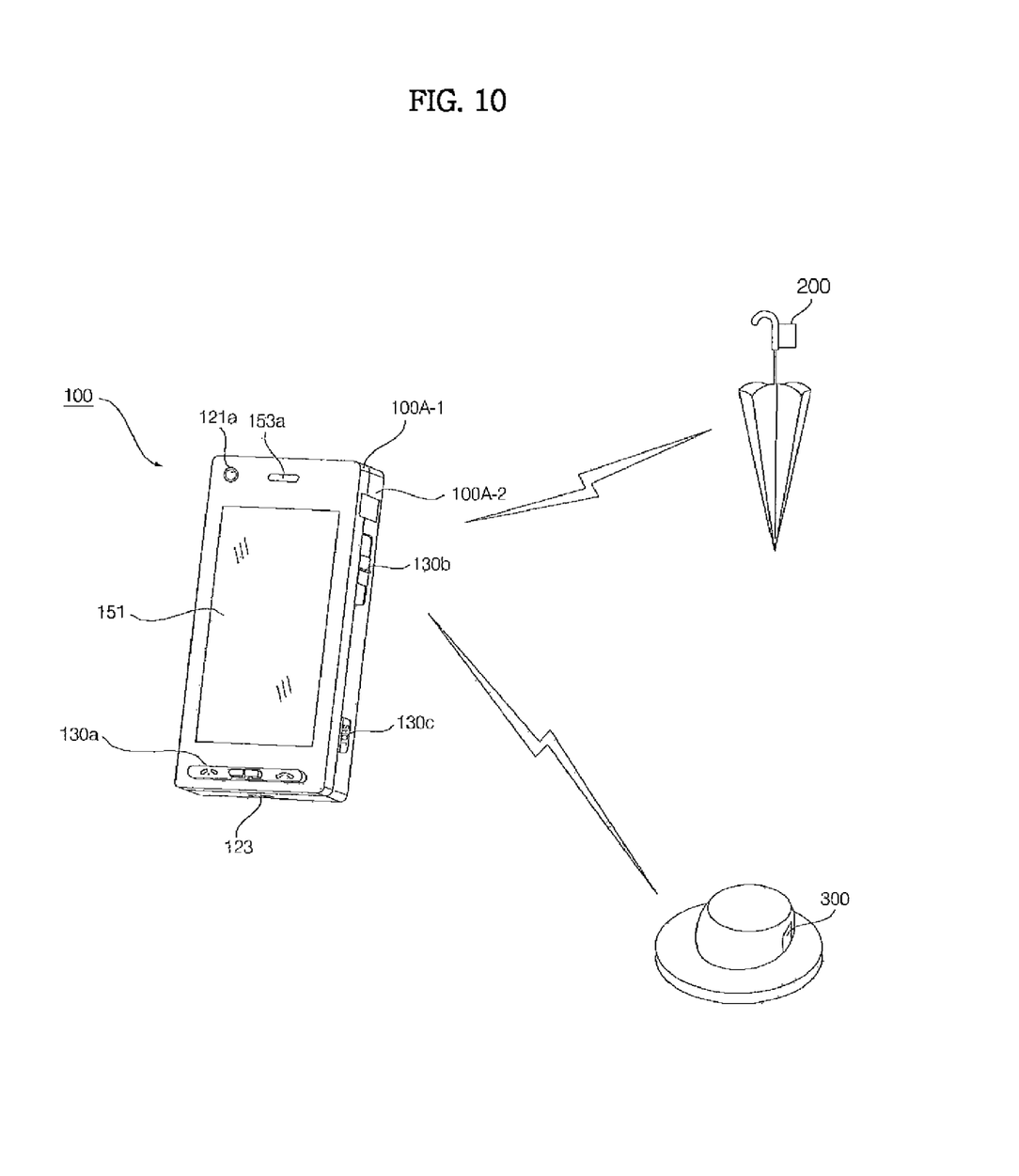

FIG. 10 is a diagram explaining how to output alarm information with the use of a medium associated with the mobile terminal 100, whereas FIGS. 8A, 8B, 9A, and 9B are diagrams explaining how to output alarm information with the use of the mobile terminal 100. Referring to FIG. 10, if weather information is received, the mobile terminal 100 may determine whether it is necessary to output alarm information. If it is necessary to output alarm information, the mobile terminal 100 may determine what medium is appropriate for outputting alarm information based on the received weather information and a plurality of pieces of medium information for different weather phenomena, and may determine whether there is such appropriate medium near the mobile terminal 100. For example, if the received weather information indicates that the weather is rainy, the mobile terminal 100 may output alarm information to an umbrella 200, and particularly, to a wireless communication device attached to the umbrella 200. Then, the umbrella 200 may output an alarm sound in response to the alarm information output by the mobile terminal 100 to alert the user to carry an umbrella with him or her. On the other hand, if the received weather information indicates that the UV index is high, the mobile terminal 100 may output alarm information to a hat 300. In this manner, it is possible to provide weather information by using various mediums, other than the mobile terminal 100.

The mobile terminal according to the present invention and the method of controlling a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible for a user to intuitively recognize weather information provided by a mobile terminal without the need to manipulate the mobile terminal. In addition, even when the user forgets to check the weather information, it is possible to allow the user to appropriately respond to the weather by outputting alarm information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:

1. A method of controlling a mobile terminal, the method comprising:
    storing, in a memory of the mobile terminal, a plurality of weather-related personal products of a user using the mobile terminal mapped with particular types of weather conditions, said weather-related personal products being used for protecting the user from weather;
    displaying, on a first area of a display unit of the mobile terminal, at least one status icon for indicating a current status of the mobile terminal, displaying, on a second area of the display unit, a first screen image as an idle screen background, and displaying, on the first screen image, at least one menu icon for executing an operational function of the mobile terminal;
    periodically receiving, via a wireless communication of the mobile terminal, weather information through a communication network;
    searching for, via a controller of the mobile terminal, a semi-transparent filter effect corresponding to the weather information, the semi-transparent filter effect being stored in advance in the mobile terminal;
    overlaying the semi-transparent filter effect onto the first screen image to create a second composite image;

displaying the second composite image as a new idle screen background;

in response to manipulation of a user input, either displaying an icon corresponding to the weather information on the new idle screen background or removing the icon corresponding to the weather information on the new idle screen background, the icon being varied automatically according to the periodically received weather information;

providing a function for enabling the user to add one of an image and an icon corresponding to the received weather information to a text message and transmitting the text message; and in response to determining whether it is necessary to output alarm information based on the received weather information, the method further comprises:

determining, via the controller, a type of weather condition included in the weather information, and selecting weather-related personal products from the memory that are mapped to the determined type of weather condition; and outputting, via the wireless communication unit, alarm information to the selected weather-related personal products among the plurality of weather-related personal products, the selected weather-related personal products configured to output an alarm sound based on the received alarm information.

2. The method of claim 1, wherein the semi-transparent filter effect covers a majority of the first screen image.

3. The method of claim 1, wherein the semi-transparent filter effect covers an entirety of the first screen image.

4. The method of claim 1, wherein the first screen image is chosen in response to a user command.

5. The method of claim 1, wherein the weather information is provided in real time through the communication network.

6. The method of claim 1, wherein the semi-transparent filter effect corresponding to the weather information includes at least one of a filter effect for applying a halation effect to the first screen image, a filter effect for overlaying an image of water drops over the first screen image, and a filter effect for overlaying an image of snow over the first screen image.

7. The method of claim 1, further comprising applying the semi-transparent filter effect corresponding to the weather information to a message and transmitting the message.

8. The method of claim 1, wherein the alarm signal is at least one of an alarm sound and an alarm voice message corresponding to the received weather information.

9. The method of claim 1, further comprising modifying previously set alarm settings according to the received weather information such that an alarm is set to go off later or earlier than a previously set original alarm time.

10. The method of claim 1, wherein the weather-related personal products include at least one of a raincoat, an umbrella, a mask, a hat or sunblock.

11. A mobile terminal comprising:

a memory configured to store a plurality of weather-related personal products of a user using the mobile terminal mapped with particular types of weather conditions, said weather-related personal products being used for protecting the user from weather;

a display module configured to display at least one status icon for indicating a current status of the mobile terminal on a first area of a display screen, display a first screen image as an idle screen background on a second area of the display screen, and display at least one menu icon for executing an operational function of the mobile terminal on the first screen image;

a user manipulation unit configured to generate key input data based on user input;

a wireless communication unit configured to periodically receive weather information through a communication network; and a controller configured to:

search for a semi-transparent filter effect corresponding to the weather information, the semi-transparent filter effect being stored in advance in the mobile terminal;

overlay the semi-transparent filter effect onto the first screen image to create a second composite image, display the second composite image as a new idle screen background;

in response to manipulation of the user manipulation unit, either display an icon corresponding to the weather information on the new idle screen background or remove the icon corresponding to the weather information on the new idle screen background, the icon being varied automatically according to the periodically received weather information; and provide a function for enabling the user to add one of an image and an icon corresponding to the received weather information to a text message and transmitting the text message, wherein the controller is further configured to determine a type of weather condition included in the weather information, to select weather-related personal products from the memory that are mapped to the determined type of weather condition, and to output alarm information, via the wireless communication unit, to the selected weather-related personal products among the plurality of weather-related personal products, the selected weather-related personal products capable of outputting an alarm sound based on the received alarm information.

12. The mobile terminal of claim 11, wherein the semi-transparent filter effect covers a majority of the first screen image.

13. The mobile terminal of claim 11, wherein the semi-transparent filter effect covers an entirety of the first screen image.

14. The mobile terminal of claim 11, further comprising a memory configured to store at least one semi-transparent filter effect corresponding to the weather information.

15. The mobile terminal of claim 14, wherein the at least one semi-transparent filter effect corresponding to the weather information includes at least one of a filter effect for applying a halation effect to the first screen image, a filter effect for overlaying an image of water drops over the first screen image, and a filter effect for overlaying an image of snow over the first screen image.

16. The mobile terminal of claim 11, wherein the weather-related personal products include at least one of a raincoat, an umbrella, a mask, a hat or sunblock.

* * * * *